United States Patent Office 3,121,078
Patented Feb. 11, 1964

3,121,078
NEW PREGNENE AND PREGNADIENE COMPOUNDS AND PROCESSES FOR PREPARING THE SAME
Harry L. Slates, Madison, and Norman L. Wendler, Summit, N.J., assignors to Merck & Co., Inc., Rahway, N.J., a corporation of New Jersey
No Drawing. Filed Nov. 7, 1957, Ser. No. 694,929
15 Claims. (Cl. 260—239.5)

This invention relates generally to novel steroid compounds and to processes for preparing the same. More particularly, it is concerned with 21-hydroxy-16-methyl-11 - oxygenated - 4,16 - pregnadiene - 3,20 - dione compounds. It is also concerned with the preparation of the novel 21 - hydroxy - 11 - oxygenated - 4 - pregnene - 16α, 17α-methyleneazo-3,20-dione compounds produced as intermediates in the synthesis of 21-hydroxy-16-methyl-11-oxygenated - 4,16 - pregnadiene - 3,20 - dione compounds. These compounds are active medicinal adjuncts for reducing the abnormally high eosinophil count accompanying many diseases.

These novel 21-hydroxy-16-methyl-11-oxygenated-4,16-pregnadiene-3,20-dione compounds subject of the present invention, may be chemically represented as follows

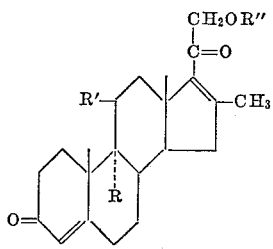

wherein R is hydrogen or fluorine, R' is keto or hydroxyl and R" is hydrogen, alkyl or an acyl radical.

In preparing these novel chemical compounds, the starting material utilized is 21-hydroxy-11-oxygenated-4,16-pregnadiene-3,20-dione which has the following structural formula

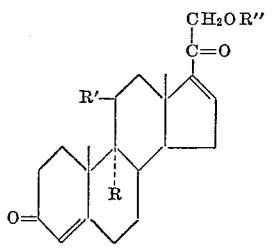

wherein R, R' and R" are as above.

It has been found that the 21-hydroxy-11-oxygenated-4,16-pregnadiene-3,20-dione may be caused to react with diazomethane to yield 21-hydroxy-11-oxygenated-4-pregnene-16α,17α-methyleneazo-3,20-dione having the structural formula

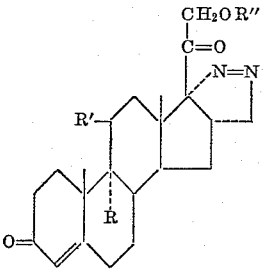

wherein R, R' and R" are as above. The compound thus obtained may then be heated to form the novel 21-hydroxy - 16 - methyl - 11 - oxygenated - 4,16 - pregnadiene-3,20-dione compounds which may be identified by the following formula

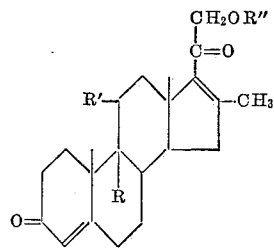

wherein R, R' and R" are as above.

The compounds employed as starting materials in the process of this invention are conveniently prepared by reacting an 17α,21-dihydroxy-11-oxygenated-4-pregnene-3,20-dione-21-acetate-3,20-disemicarbazone with hot acetic acid followed by removal of the semicarbazide groups with pyruvic acid. The 21-hydroxy-11-oxygenated-4,16-pregnadiene-3,20-dione starting materials include 21-hydroxy-4,16-pregnadienes-3,11,20-trione and esters thereof and particularly 21-lower hydrocarbon carbonyl esters as for example 21-hydroxy-4,16-pregnadiene-3,11,20-trione 21-benzoate; 21-hydroxy-4,16-pregnadiene-3,11,20-trione 21-lower alkanoates such as 21-hydroxy-4,16-pregnadiene-3,11,20-trione 21-acetate; 21-hydroxy-4,16-pregnadiene-3,11,20-trione 21-propionate; 21-hydroxy-4,16-pregnadiene-3,11,20-trione 21-alkyl ethers; 11,21-dihydroxy-4,16-pregnadiene-3,20-dione and esters thereof and particularly 21-lower hydrocarbon carbonyl esters as for example, 11,21 - dihydroxy - 4,16 - pregnadiene - 3,20-dione 21-benzoate; 11,21-dihydroxy-4,16-pregnadiene-3, 20-dione 21-lower alkanoates such as 11,21-dihydroxy-4, 16-pregnadiene-3,20-dione 21-acetate; 11,21-dihydroxy-4, 16 - pregnadiene - 3,20-dione 21 - propionate; 11,21 - dihydroxy-4,16-pregnadiene-3,20-dione 21-alkyl ethers; 9α-fluoro - 21 - hydroxy - 4,16 - pregnadiene - 3,11,20-trione and esters thereof and particularly 21-lower hydrocarbon carbonyl esters as for example 9α-fluoro-21-hydroxy-4, 16-pregnadiene-3,11,20-trione 21-benzoate; 9α-fluoro-21-hydroxy-4,16-pregnadiene-3,11,20-trione 21-lower alkanoates such as 9α-fluoro-21-hydroxy-4,16-pregnadiene-3,11, 20-trione 21-acetate; 9α-fluoro-21-hydroxy-4,16-pregnadiene-3,11,20-trione 21-propionate; 9α-fluoro-21-hydroxy-4,16-pregnadiene-3,11,20-trione 21-alkyl ethers; 9α-fluoro - 11,21 - dihydroxy - 4,16 - pregnadiene - 3,20-dione and esters thereof and particularly 21-lower hydrocarbon carbonyl esters as for example 9α-fluoro-11,21-dihydroxy-4,16-pregnadiene 3,20-dione 21-benzoate; 9α-fluoro - 11,21 - dihydroxy - 4,16 - pregnadiene - 3,20-dione 21-lower alkanoates such as 9α-fluoro-11,21-dihydroxy - 4,16 - pregnadiene - 3,20 - dione 21 - acetate; 9α-fluoro - 11,21 - dihydroxy - 4,16 - pregnadiene - 3,20-dione 21-propionate; and 9α-fluoro-11,21-dihydroxy-4,16-pregnadiene-3,20-dione 21-alkyl ethers.

In accordance with the present invention, any of the starting materials enumerated above is reacted with diazomethane in an inert solvent to form the corresponding methyleneazo compounds, namely, 21-hydroxy-4-pregnene-16α,17α-methyleneazo-3,11,20-trione and esters thereof and particularly 21-lower hydrocarbon carbonyl esters as for example 21-hydroxy-4-pregnene-16α,17α-methyleneazo-3,11,20-trione 21- benzoate; 21-hydroxy-4-pregnene-16α,17α-methyleneazo-3,11,20-trione 21-lower alkanoates such as 21-hydroxy-4-pregnene-16α,17α-methyleneazo-3,11,20-trione 21-acetate; 21-hydroxy-4-pregnene-16α,17α-methyleneazo-3,11,20-trione 21-alkyl ethers; 11β,21-dihydroxy - 4 - pregnene - 16α,17α - methyleneazo-3,20-dione and esters thereof and particularly, lower hydrocarbon carbonyl esters as for example, 11β,21-dihydroxy-4-pregnene-16α,17α-methyleneazo-3,20-dione 21-benzoate; 11β,21-dihydroxy-4-pregnene-16α,17α-methyleneazo-3,20-dione 21-lower alkanoates such as 11β,21-dihydroxy-4-pregnene-16α,17α-methyleneazo-3,20-dione 21-acetate; 11β,21-dihydroxy-4-pregnene-16α,17α-methyleneazo-3,20-dione 21-propionate; 11β,21-dihydroxy-4-pregnene-16α,17α-methyleneazo-3,20-dione 21-alkyl ethers; 9α-fluoro-21-hydroxy-4-pregnene-16α,17α-methyleneazo-3,11,20-trione and esters thereof and particularly 21-lower hydrocarbon carbonyl esters as for example 9α-fluoro-21-hydroxy-4-pregnene-16α,17α-methyleneazo-3,11,20-trione 21-benzoate; 9α-fluoro-21-hydroxy-4-pregnene-16α,17α-methyleneazo-3,11,20-trione 21-lower alkanoate such as 9α-fluoro-21-hydroxy-4-pregnene-16α,17α-methyleneazo-3,11,20-trione 21-acetate; 9α-fluoro-21-hydroxy-4-pregnene-16α,17α-methyleneazo-3,11,20-trione 21-alkyl ethers; 9α-fluoro-11β,21-dihydroxy-4-pregnene-16α,17α-methyleneazo-3,20-dione and esters thereof and particularly lower hydrocarbon carbonyl esters as for example 9α-fluoro-11β,21-dihydroxy-4-pregnene-16α,17α-methyleneazo-3,20-dione 21-benzoate; 9α-fluoro-11β,21-dihydroxy-4-pregnene-16α,17α-methyleneazo-3,20-dione 21-lower alkanoates such as 9α-fluoro-11β,21-dihydroxy-4-pregnene-16α,17α-methyleneazo-3,20-dione 21-acetate; 9α-fluoro-11β,21-dihydroxy-4-pregnene-16α,17α-methyleneazo-3,20-dione 21-propionate; 9α-fluoro-11β,21-dihydroxy-4-pregnene-16α,17α-methyleneazo-3,20-dione 21-alkyl esters.

Upon heating any of the above enumerated methyleneazo compounds, the corresponding 16-methyl derivative is formed with evolution of nitrogen. The compounds thus formed include 21-hydroxy-16-methyl-4,16-pregnadiene-3,11,20-trione and esters thereof and particularly 21-lower hydrocarbon carbonyl esters for example 21-hydroxy-16-methyl-4,16-pregnadiene-3,11,20-trione 21-benzoate; 21-hydroxy-16-methyl-4,16-pregnadiene-3,11,20-trione 21-benzoate; 21-lower alkanoates such as 21-hydroxy-16-methyl-4,16-pregnadiene-3,11,20-trione 21-acetate; 21-hydroxy-16-methyl-4,16-pregnadiene-3,11,20-trione 21-propionate; 21-hydroxy-16-methyl-4,16-pregnadiene-3,11,20-trione 21-alkyl ethers; 11,21-dihydroxy-16-methyl-4-16-pregnadiene-3,20-dione and esters thereof and particularly 21-lower hydrocarbon carbonyl esters as for example, 11-21-dihydroxy-16-methyl-4,16-pregnadiene-3,20-dione 21-benzoate; 11,21-dihydroxy-16-methyl-4,16-pregnadiene-3,20-dione 21-lower alkanoates such as 11,21-dihydroxy-16-methyl-4,16-pregnadiene-3,20-dione 21-acetate; 11,21-dihydroxy-16-methyl-4,16-pregnadiene-3,20-dione 21-propionate; 11,21-dihydroxy-16-methyl-4,16-pregnadiene-3,20-dione 21-alkyl ethers; 9α-fluoro-21-hydroxy-16-methyl-4,16-pregnadiene-3,11,20-trione and esters thereof and particularly 21-lower hydrocarbon carbonyl esters as for example 9α-fluoro-21-hydroxy-16-methyl-4,16-pregnadiene-3,11,20-trione 21-benzoate; 9α-fluoro-21-hydroxy-16-methyl-4,16-pregnadiene-3,11,20-trione 21-lower alkanoates such as 9α-fluoro-21-hydroxy-16-methyl-4,16-pregnadiene-3,11,20-trione 21-acetate; 9α-fluoro-21-hydroxy-16-methyl-4,16-pregnadiene-3,11,20-trione 21-propionate; 9α-fluoro-21-hydroxy-16-methyl-4,16-pregnadiene-3,11,20-trione 21-alkyl ethers; 9α-fluoro-11,21-dihydroxy-16-methyl-4,16-pregnadiene-3,20-dione and esters thereof and particularly 21-lower hydrocarbon carbonyl esters as for example, 9α-fluoro-11,21-dihydroxy-16-methyl-4,16-pregnadiene-3,20-dione 21-benzoate; 9α-fluoro-11,21-dihydroxy-16-methyl-4-16-pregnadiene-3,20-dione 21-lower alkanoates such as 9α-fluoro-11,21-dihydroxy-16-methyl-4,16-pregnadiene-3,20-dione 21-acetate; 9α-fluoro-11,21-dihydroxy-16-methyl-4,16-pregnadiene-3,20-dione 21-propionate; and 9α-fluoro-11,21-dihydroxy-16-methyl-4,16-pregnadiene-11,21-diol-3,20-dione 21-alkyl ethers. Any of the above steroids having an alkanoate in the 2-position can be converted to the alcohol by hydrolysis by potassium bicarbonate in an aqueous solution.

In accordance with one embodiment of the present invention a starting material such as 21-hydroxy-4,16-pregnadiene-3,11,20-trione 21-acetace is added to an inert solvent such as tetrahydrofuran and an excess of diazomethane is added. The solvent is removed by concentration and the 21-hydroxy-4-pregnene-16α,17α-methyleneazo-3,11,20-trione 21-acetate is crystallized from ethyl acetate or an acetone-ether mixture. The alcohol, namely, 21-hydroxy-4-pregnene-16α,17α-methyleneazo-3,11,20-trione may be obtained by hydrolysis of 21-hydroxy-pregnene-16α,17α-methyleneazo-3,11,20-trione 21-acetate in aqueous alcohol solution with potassium bicarbonate.

Heating 21-hydroxy-4-pregnene-21-ol-16α,17α-methyleneazo-3,11,20-trione 21-acetate until nitrogen evolution ceased results in the 21-hydroxy-16-methyl-4,16-pregnadiene-3,11,20-trione 21-acetate. After cooling the melt can be crystallized from ethyl acetate or an acetone-ether mixture. The 21-hydroxy-16-methyl-4,16-pregnadiene-3,11,20-trione 21-acetate can be hydrolyzed with potassium carbonate in an aqueous alcohol medium to form 21-hydroxy-16-methyl-4,16-pregnadiene-3,11,20-trione.

The following examples are to be understood as illustrative only and are in no way to be construed as limiting the invention.

*Example 1*

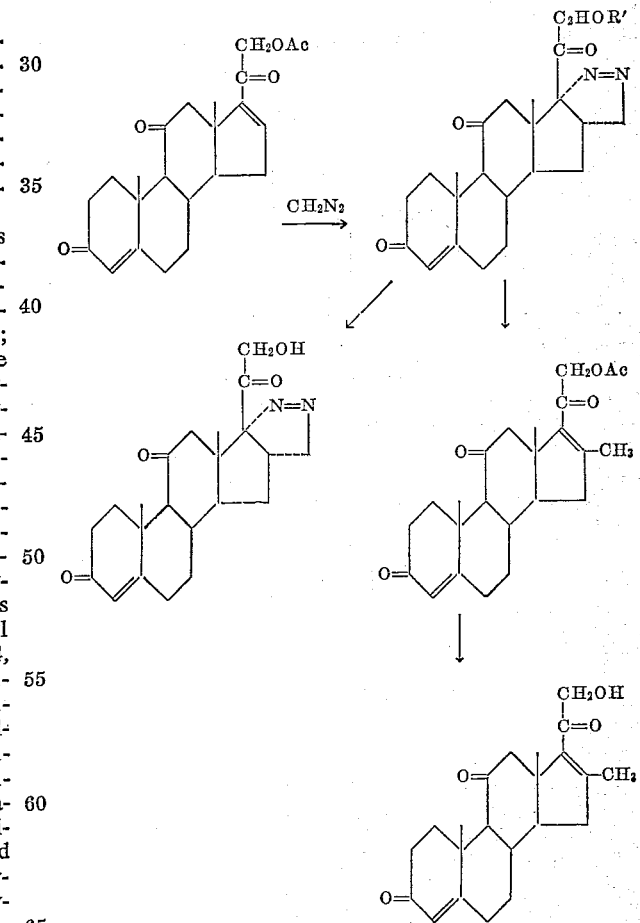

To 2.0 g. of 21-hydroxy-4,16-pregnadiene-3,11,20-trione 21-acetate prepared as described herein below in 50 ml. of dry tetrahydrofuran was added a three-fold excess of diazo methane. The reaction mixture was allowed to stand at ca. 20° C. for 6 hours and then concentrated in vacuo. The residue was crystallized from ethyl acetate to yield 1.5 g. of 21-hydroxy-4-pregnene-16α,17α-methyleneazo-3,11,20-trione 21-acetate M.P. 175°–176° C. with gas evolution.

A sample of this latter substance was hydrolyzed in aqueous alcohol with potassium bicarbonate to form 21-hydroxy-4-pregnene-16α,17α-methyleneazo - 3,11,20-trione.

The 21 - hydroxy-4-pregnene-21-ol-16α,17α-methyleneazo-3,11,20-trione 21-acetate obtained as above was heated to 180–185° C. in vacuo (<1 mm.) and held at this temperature until the evolution of nitrogen had ceased. After cooling, the melt was crystallized from ethyl acetate to yield 21-hydroxy-16-methyl-4,16-pregnadiene-3,11,20-trione 21-acetate M.P. 171°–173° C., λmax. 241 mμ, E% 526.

The starting material 21-hydroxy-4,16-pregnadiene-3,11,20-trione 21-acetate may be prepared as follows:

A solution of 5.0 g. of 17α,21-dihydroxy-4-pregnene-3,20-dione 21-acetate-3,20-disemicarbazone in 100 ml. of acetic acid containing 5 ml. of acetic anhydride was refluxed in a nitrogen atmosphere for 1 hour. The pale yellow to red reaction mixture was concentrated in vacuo to a volume of 60 ml. and treated with 30 ml. of water and 15 ml. of pyruvic acid, and allowed to stand at room temperature for 40 hours and at 60° for 2 hours. After dilution with water, the product was extracted with chloroform and the chloroform solution was washed with water, 5% potassium bicarbonate, water, and dried over magnesium sulfate. The solvent was removed in vacuo and the residue was chromatographed on 200 g. of neutral alumina and elution with benzene afforded, after crystallization from acetone-ether, 1.37 g. (38%) of 21-hydroxy-4,16-pregnadiene-3,11,20-trione 21-acetate M.P. 186–187° C.

$\lambda_{max.}^{CH_3OH}$ 237–238 mμ, ε=25,200

Analysis calculated for $C_{23}H_{28}O_5$: C, 71.85; H, 7.34. Found: C, 71.96; H, 7.26.

*Example 2*

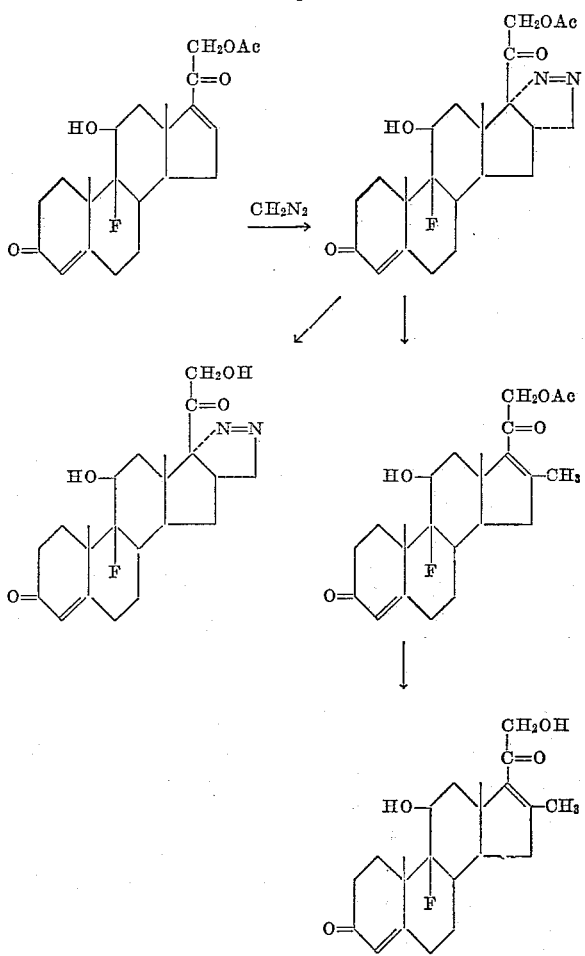

To 2.9 g. of 9α-fluoro-11β,21-dihydroxy-4,16-pregnadiene-3,20-dione 21-acetate prepared as described hereinafter in 100 ml. of dry tetrahydrofuran was added a threefold excess of diazomethane. The reaction mixture was allowed to stand at ca. 20° C. for about 16 hours and then concentrated in vacuo. The residue was crystallized from acetone-ether to yield 3.0 g. of 9α-fluoro-11β,21-dihydroxy-4-pregnene-16α,17α-methyleneazo-3,20 - dione 21-acetate M.P. 186–187° C. with gas evolution.

A sample of 9α-fluoro-11β,21-dihydroxy-4-pregnene-16α,17α-methyleneazo-3,20-dione 21-acetate was hydrolized in aqueous alcohol with potassium bicarbonate to yield 9α - fluoro - 11β,21-dihydroxy-4-pregnene-16α,17α-methyleneazo-3,20-dione.

The 9α-fluoro-11β,21-dihydroxy-4-pregnene-16α, 17α-methyleneazo-3,20-dione 21-acetate obtained as above was heated to 190–195° C. in vacuo (<1 mm.) and held at this temperature until nitrogen evolution ceased. After cooling, the melt was crystallized twice from acetone-ether to give 1.3 g. of 9α-fluoro-11β,21-dihydroxy-16-methyl-4,16-pregnadiene-3,20-dione 21-acetate M.P. 179–181° C., λmax. 242μ, E% 550.

A sample of 9α-fluoro-11β,21-dihydroxy-16-methyl-4,16-pregnadiene-3,20-dione 21-acetate was hydrolyzed in aqueous alcohol with potassium bicarbonate to form 9α-fluoro-11β,21-dihydroxy-4,16-pregnadiene-3,20-dione.

9α-fluoro-11β,21-dihydroxy-4,16-pregnadiene- 3,20-dione 21-acetate, the starting material for this example, may be prepared as follows:

To a solution of 5.0 g. of 9α-fluoro-11β,17α,21-trihydroxy-4-pregnene-3,20-dione 21-acetate in 200 ml. of methanol was added a solution of 5.0 g. of semicarbazide and 3.0 g. of semicarbazide hydrochloride in 10 ml. of water. The reaction mixture was heated under reflux for 4 hours, then cooled to ca. 5° C. The crystalline product was isolated by filtration to yield 5.6 g. of 9α-fluoro-11β, 17α,21-trihydroxy-4-pregnene-3,20-dione 21-acetate-3,20-disemicarbazone; M.P. 220° C. with decomposition;

$\lambda_{max.}^{MeOH}$ 267 mμ, E% 571

A solution of 5.0 g. of 9α-fluoro-11β,17α,21-trihydroxy-4-pregnene-3,20-dione 21-acetate - 3,20 - disemicarbazone in 100 ml. of acetic acid containing 2 ml. of acetic anhydride was refluxed in a nitrogen atmosphere for 1 hour. The reaction mixture was concentrated in vacuo to a volume of 60 ml. and treated with 30 ml. of water and 15 ml. of pyruvic acid, and allowed to stand at room temperature for 18 hours and 2 hours at 60° C. After dilution with water, the product was extracted with chloroform and the chloroform solution was washed with water, 5% potassium bicarbonate, water, and dried over magnesium sulfate. The solvent was removed in vacuo and the residue was chromatographed on 200 g. of neutral alumina and elution with benzene-chloroform mixtures afforded after crystallization from acetone-ethanol 0.8 g. of 9α-fluoro-11β,21-dihydroxy-4,16-pregnadiene-3, 20-dione 21-acetate, M.P. 184–186° C., $\lambda_{max.}^{MeOH}$ 239 mμ, E% 637

It should be understood that various changes may be made in the present process as herein described without affecting the results attained. Thus, various modifications of conditions as to time, temperature, etc. and various changes in procedure differing from those herein given as illustrative of the preferred embodiments of this invention may be made without departing from the scope thereof. Accordingly, the scope of our invention is to be determined in accordance with the prior art and the appended claims.

3,121,078

We claim:
1. A compound of the formula:

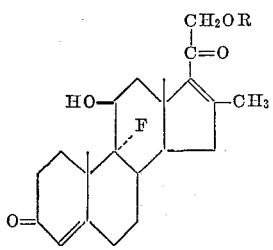

wherein R is selected from the group consisting of hydrogen and lower alkanoyl radicals.
2. 9α-fluoro-11β,21-dihydroxy-16-methyl - 4,16 - pregnadiene-3,20-dione.
3. 9α-fluoro-11β,21-dihydroxy-16-methyl - 4,16 - pregnadiene-3,20-dione 21-lower hydrocarbon carbonyl group.
4. A compound of the formula:

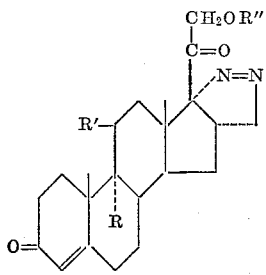

wherein R is selected from the group consisting of hydrogen and fluorine, R' is selected from the group consisting of keto and hydroxy and R'' is selected from the group consisting of hydrogen, and a lower hydrocarbon carbonyl group.
5. 21-hydroxy-4-pregnene - 16α,17α - methyleneazo-3,11,20-trione.
61. 21-hydroxy - 4 - pregnene - 16α,17α - methyleneazo-3,11,20-trione 21-acetate.
7. 9α-fluoro-11β,21-dihydroxy - 4 - pregnene-16α,17α-methyleneazo-3,20-dione.
8. 9α-fluoro-11β,21-dihydroxy - 4 - pregnene-16α,17α-methyleneazo-3,20-dione 21-acetate.
9. The process which comprises reacting a compound of the formula:

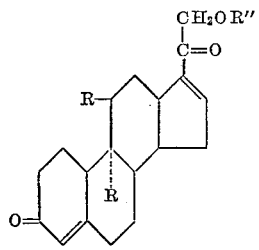

wherein R is selected from the group consisting of hydrogen and fluorine, R' is selected from the group consisting of keto and hydroxy and R'' is selected from the group consisting of hydrogen, and a lower hydrocarbon carbonyl group with diazomethane to form a compound of the formula:

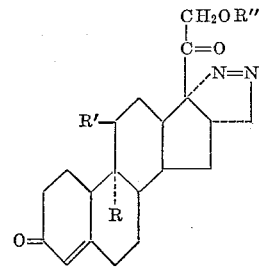

10. The process which comprises reacting 21-hydroxy 4,16-pregnadiene-3,11,20-trione with diazomethane to form 21-hydroxy-4-pregnene - 16α,17α - methyleneazo-3,11β,20-trione and heating the latter compound to form 21-hydroxy-16-methyl-4,16-pregnadiene-3,11,20-trione.

11. The process which comprises reacting 21-hydroxy-4,16-pregnadiene-3,11,20-trione 21-lower hydrocarbon carbonyl with diazomethane to form 21-hydroxy-4-pregnene-16α,17α-methyleneazo-3,11β,20-trione 21-lower hydrocarbon carbonyl and heating the latter compound to form 21-hydroxy - 16 - methyl-4,16-pregnadiene-3,11,20-trione 21-lower hydrocarbon carbonyl.

12. The process which comprises reacting 21-hydroxy-4,16-pregnadiene-3,11,20-trione 21-lower hydrocarbon carbonyl with diazomethane to form 21-hydroxy-4-pregnene-16α,17α-methyleneazo-3,11β,20-trione 21-lower hydrocarbon carbonyl and heating the latter compound to form 21-hydroxy - 16 - methyl-4,16-pregnadiene-3,11,20-trione 21-lower hydrocarbon carbonyl and hydrolyzing the latter compound to form 21-hydroxy-16-methyl-4,16-pregnadiene-3,11,20-trione.

13. The process which comprises reacting 9α-fluoro-11β,21-dihydroxy-4,16-pregnadiene-3,20-dione with diazomethane to form 9α-fluoro-11β,21-dihydroxy-4-pregnene-16α,17α-methyleneazo-3,20-dione and heating the latter compound to form 9α-fluoro-11β,21-dihydroxy-16-methyl-4,16-pregnadiene-3,20-dione.

14. The process which comprises reacting 9α-fluoro-11β,21-dihydroxy-4,16-pregnadiene - 3,20 - dione 21-lower hydrocarbon carbonyl with diazomethane to form 9α-fluoro-11β,21-dihydroxy - 4-pregnene - 16α,17α - methyleneazo-3,20-dione 21-lower hydrocarbon carbonyl and heating the latter compound to form 9α-fluoro-11β,21-dihydroxy-16 - methyl - 4,16 - pregnadiene-3,20-dione 21-lower hydrocarbon carbonyl.

15. The process which comprises reacting 9α-fluoro-11β,21-dihydroxy-4,16-pregnadiene - 3,20-dione 21-lower hydrocarbon carbonyl with diazomethane to form 9α-fluoro-11β,21-dihydroxy-4-pregnene - 16α,17α-methyleneazo-3,20-dione 21-lower hydrocarbon carbonyl, heating the latter compound to form 9α-fluoro-11β,21-dihydroxy-16-methyl-4,16-pregnadiene-3,20-dione 21-lower hydrocarbon carbonyl and hydrolyzing the latter compound to form 9α-fluoro-11β,21-dihydroxy - 16-methyl-4,16-pregnadiene-3,20-dione.

References Cited in the file of this patent
UNITED STATES PATENTS
2,793,217    Muller _____ May 21, 1957

OTHER REFERENCES
Noller: Textbook of Organic Chemistry (1951), page 316, W. B. Saunders Co., Philadelphia, Pa.